United States Patent [19]

Podlas

[11] Patent Number: 5,382,287

[45] Date of Patent: Jan. 17, 1995

[54] CLAY AND MICA REPLACEMENT WITH CMC IN JOINT COMPOUND

[76] Inventor: Thomas J. Podlas, 9 Paddington Ct., Hockessin, Del. 19707

[21] Appl. No.: 508,563

[22] Filed: Apr. 13, 1990

[51] Int. Cl.⁶ ............................................. C09D 101/28
[52] U.S. Cl. ................................................. 106/197.2
[58] Field of Search .................... 106/188, 197.1, 197.2

[56] References Cited

U.S. PATENT DOCUMENTS

| | | | |
|---|---|---|---|
| 3,014,808 | 12/1961 | Nyberg | 106/197.2 |
| 3,891,582 | 6/1975 | Desmarais | 260/17 R |
| 3,891,582 | 6/1975 | Desmarais | 106/141 |
| 4,558,079 | 12/1985 | Desmarais | 524/43 |
| 4,558,079 | 12/1985 | Desmarais | 106/197.1 |
| 4,614,545 | 9/1986 | Hess | 106/188 |

*Primary Examiner*—David Brunsman

[57] ABSTRACT

Sodium carboxymethylcellulose (CMC) with a D.S. between 0.35 and 0.75 and D.P. between 200 and 4000 serves as a swelling agent and can replace clay and/or mica in a joint compound formulation when used in an amount of 0.01 to 0.5% by weight.

6 Claims, No Drawings

CLAY AND MICA REPLACEMENT WITH CMC IN JOINT COMPOUND

FIELD OF THE INVENTION

The invention relates to compositions useful as joint sealing materials. In particular the invention relates to a superabsorbent type of uncrosslinked sodium carboxymethylcellulose to effect improvements in a joint compound.

BACKGROUND OF THE INVENTION

Wallboard is generally installed in large panels which are nailed or glued to the studding of the wall. The joints where sections of the board are butted together are covered with tape and then the taped joints and all nails are covered with a joint compound. For example, U.S. Pat. No. 3,891,582 describes a joint compound employed with wallboard containing a resinous binder, limestone, clay, mica, lubricant, stabilizer and a thickener as dry ingredients which are mixed with water to form a dope which is normally applied by troweling. U.S. Pat. No. 4,558,079 describes mixtures of thickeners used within a joint compound. U.S. Pat. No. 3,891,582 describes the use of a fibrous, substantially insoluble carboxymethylcellulose (CMC).

Yet in spite of what was known in the art prior to the time of the present invention, a need still existed for simpler and more cost effective means for producing joint compounds.

SUMMARY OF THE INVENTION

It is an object of the invention to provide a joint compound containing uncrosslinked sodium carboxymethylcellulose as a clay and/or mica replacement.

An aqueous joint compound formulation is comprised of a swelling agent, binder, lubricant and thickener; characterized in that the swelling agent is a highly thixotropic sodium carboxymethylcellulose with a degree of substitution (D.S.) between 0.35 and 0.75 and a degree of polymerization (D.P.) between 200 and 4000 wherein the sodium carboxymethylcellulose is present in an amount of 0.01% to 0.5% by weight based on the total weight of the formulation.

In addition to the principal ingredients mentioned above, a typical joint compound will frequently also contain a dispersant, a defoamer, and a preservative.

DETAILED DESCRIPTION OF THE INVENTION

Attapulgite and other clays now used in joint compounds in an amount from about 1.5% to 3.0% by weight based on the total weight of formulation may have to be phased out due to OSHA regulations. These clays also give variable results in finished product due to batch to batch variations in absorption. Not only can lower amounts of CMC give a more uniform product batch to batch, but a product with lower cracking can also be produced.

Unlike the fibrous carboxymethylated cellulose derivatives described in U.S. Pat. No. 3,891,582 as replacement for asbestos, the sodium carboxymethylcellulose (CMC) of the present invention is a fine absorbent powder. In fact, joint compounds can be formulated comprising both the fibrous CMC and the absorbent CMC of the invention.

A sodium carboxymethylcellulose especially suited for the invention is Aquasorb ® A250-1 with a D.S. of 0.5 to 0.60 and a D.P. of 3000 available from Aqualon Company. Other suitable sodium carboxymethylcellulose materials are uncrosslinked with a D.S. between 0.35 and 0.75 and a D.P. between 200 and 4000. Preferred materials have a D.S. between 0.5 and 0.7 and a D.P. between 2000 and 4000 and display extreme thixotropic behavior.

Suitable clays for use in a joint compound are any of the natural earthy, fine-grained, largely crystalline substances of hydrous aluminum silicates usually containing alkalies, alkaline earth, and iron that make up the group of clay materials. Included are sepiolite, montmorillonite, bentonite, illite, kaolin, chlorites sepiolite and attapulgite. Attapulgite is the preferred clay.

The resinous binder used in joint compound is normally a coalescable vinyl material, such as poly (vinyl acetate) which upon drying or curing of the cement forms a thin matrix to hold the clay, mica, limestone, and in the present case, the CMC. Other materials useful as the binder include starch, casein, polyacrylamide, copolymers of acrylamide and acrylic acid, etc.

Typically, joint compounds can be prepared by combining all of the wet ingredients (and $K_2CO_3$, if used) and mixing for one minute to homogenize. A blend of all the solids is then added to the mixing bowl, with continuing mixing. The entire mass is blended for a total of 20 minutes. This procedures may be modified by different manufacturers.

The following examples illustrate the practice of the invention which has industrial applicability in the construction area. Parts and percentages are by weight unless otherwise indicated. Viscosity was measured in Brabender units (B.U.) determined by ASTM C474-67. Adhesion was measured by ASTM C-474-67. Cracking was measured on vertical panels with air forced across the panels from a 14 inch oscillating fan for 45 minutes and then allowed to dry overnight using ratings as: none (N), very slight (V.S), slight (S), moderate (M) or heavy (H). Shrinkage was measured as a percent of the originally applied joint compound.

EXAMPLE 1

A joint compound was prepared using 250 parts limestone, 76 parts mica, 76 parts clay, 61 parts latex binder, 4 parts dispersant and 280 parts water. Defoamer and preservative were added as required for testing. This formulation served as a control for experiments in which clay, mica and both clay and mica were partially or completely replaced by sodium carboxymethylcellulose available from the Aqualon Company as Aquasorb ® A250-1.

TABLE 1

|  | Control | Clay-Free 1 | Clay-Free 2 |
|---|---|---|---|
| Clay/Clay Substitute | 3% Attapulgite | 0.25 A250-1 | 0.20% A250-1 |
| Viscosity (BV) | 500 | 640 | 540 |
| Adhesion | 70% | 85% | 80% |
| Cracking | M to H | VS to S | VS to S |

This illustrates that complete replacement of the clay can provide improvement in both adhesion and cracking performance without severely increasing viscosity.

EXAMPLE 2

Control and experimental tests were run similar to Example 1 except that in one case the clay was replaced by A250-1, in a second case the mica was replaced by A250-1. Two sets of tests were run using different water levels to check that the advantage was observed in both cases. Table 2 summarizes the percent shrinkage observed for the two sets of tests.

TABLE 2

| Joint Compound | Test 1 | Test 2 |
| --- | --- | --- |
| Control | 20.6 | 22.1 |
| Clay free | 19.1 | 19.8 |
| Mica free | 21.6 | 21.7 |
| Clay/mica free | 20.6 | 21.0 |

As show in the table, it is possible to partially or completely replace both the clay and mica without sacrifice of shrinkage properties for the joint compound.

EXAMPLE 3

The control and experimental formulation of Example 1 and 2 was further tested in comparison to a commercially available joint compound. Table 3 gives comparative results.

TABLE 3

| Joint Compound | Test 1 | Test 2 |
| --- | --- | --- |
| Commercial A | 22.1 | 22.9 |
| Commercial B | 19.2 | 19.4 |
| Clay free | 19.1 | 19.8 |
| Mica free | 21.6 | 21.7 |
| Clay/mica free | 20.6 | 21.0 |

What is claimed is:

1. An aqueous joint compound formulation comprising a swelling agent, binder, lubricant and thickener; characterized in that the swelling agent is uncrosslinked sodium carboxymethylcellulose (CMC) with a Degree of Substitution (D.S.) between 0.35 and 0.75 and a Degree of Polymerization (D.P.) between 200 and 4000 wherein the CMC is present in an amount of 0.01% to 0.5% by weight based on the total weight of the formulation and the formulation does not contain either clay or mica.

2. The aqueous joint compound formulation of claim 1 where the CMC has a D.S. between 0.5 and 0.7 and a D.P. between 2000 and 4000.

3. An aqueous joint compound formulation comprising a swelling agent, clay, binder, lubricant and thickener; characterized in that the swelling agent is uncrosslinked sodium carboxymethylcellulose (CMC)with a D.S. between 0.35 and 0.75 and a D.P. between 200 and 4000 wherein the formulation does not contain mica.

4. The aqueous joint compound formulation of claim 3 where the CMC has a D.S. between 0.5 and 0.7 and a D.P. between 2000 and 4000.

5. An aqueous joint compound formulation comprising a swelling agent, mica, binder, lubricant and thickener, characterized in that the swelling agent is uncrosslinked sodium carboxymethylcellulose with a D.S. between 0.35 and 0.75 and a D.P. between 200 and 4000 and is a fine non-fibrous absorbent powder wherein the formulation does not contain clay.

6. The aqueous joint compound formulation of claim 5 where the CMC has a D.S. between 0.5 and 0.7 and a D.P. between 2000 and 4000.

* * * * *

UNITED STATES PATENT AND TRADEMARK OFFICE
CERTIFICATE OF CORRECTION

PATENT NO. : 5,382,287
DATED : January 17, 1995
INVENTOR(S) : Thomas J. Podlas

It is certified that error appears in the above-indentified patent and that said Letters Patent is hereby corrected as shown below:

Title Page - "[73] Assignee was omitted"

Should read:  --[73] Assignee:   Aqualon Company
                                 Wilmington, Delaware Signed and Sealed this Eleventh Day of July, 1995

Attest:

BRUCE LEHMAN

Attesting Officer    Commissioner of Patents and Trademarks